UNITED STATES PATENT OFFICE.

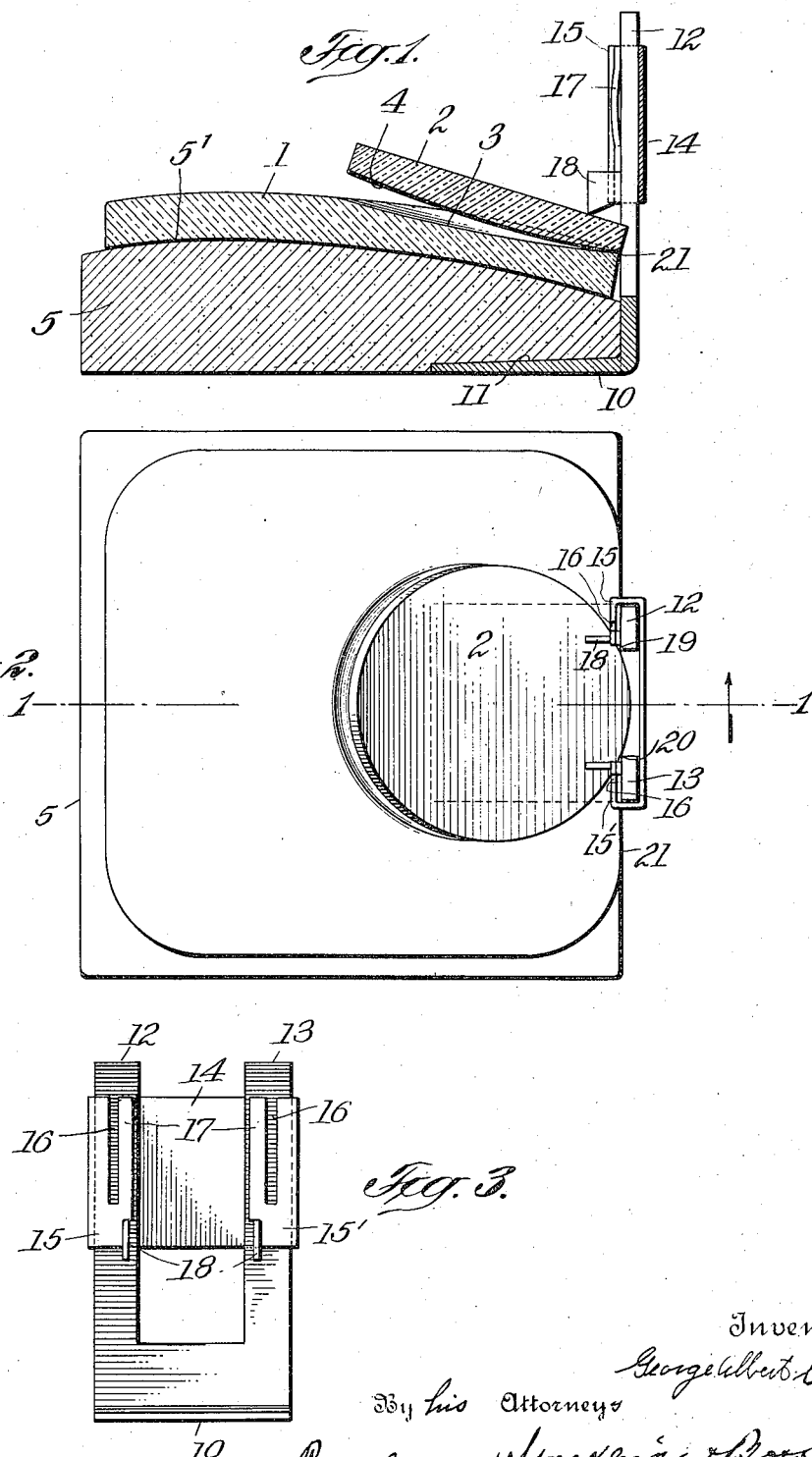

GEORGE ALBERT CLEMENT, OF NEW YORK, N. Y., ASSIGNOR TO GENERAL OPTICAL COMPANY, INCORPORATED, A CORPORATION OF NEW YORK.

FUSE-CLIP.

1,250,562.  Specification of Letters Patent.  Patented Dec. 18, 1917.

Application filed March 8, 1917. Serial No. 153,294.

*To all whom it may concern:*

Be it known that I, GEORGE ALBERT CLEMENT, a citizen of the United States, residing at New York city, in the borough of Manhattan and State of New York, have invented certain new and useful Improvements in Fuse-Clips, of which the following is a full, clear, and exact description.

This inventing relates to the manufacture of fused bifocal lenses and more particularly to means for retaining the two lens elements in proper relation during fusing.

As is well known, fused bifocal lenses are ground from blanks consisting of a major lens element having a circular minor lens element fused thereto. In one process of making such blanks, the major lens element is provided with a concave seat or depression, and the minor lens element is provided with a convex surface. The minor lens element is then mounted in tilted position in the concave seat in the major lens element so that their concave and convex surfaces are in contact at a single point which is adjacent their peripheral edges. When the lens elements are subjected to a fusing heat, the minor lens element will break down or bend progressively from its edge adjacent its point of contact with the major lens element toward the free or unsupported end of the minor lens blank. The fusing of the elements, therefore, occurs gradually and in a direction which insures that all of the air between the surfaces of the blank will be expelled before the surfaces of the blanks come together and fuse.

It is contemplated that this process of fusing the lens elements together will be used with the present invention, which has for one of its objects the provision of a clip or clamp which will hold the minor lens element tilted and yet maintain it against inadvertent lateral displacement prior to the fusing operation.

Another object of the invention is to provide a clamp or clip which will hold the minor lens element in the desired tilted position without exerting any pressure upon this element after the fusing of the elements has commenced.

With these and other objects in view, the invention consists of the constructions and combinations which will be hereinafter described and particularly pointed out in the appended claims.

In the drawings:

Figure 1 is a sectional view through a clip, the lens elements and supporting base therefor;

Fig. 2 is a plan view of Fig. 1; and

Fig. 3 is a front elevation of the clip.

In the particular embodiment shown, the clip is shown associated with the lens elements of a blank for forming a toric lens, the major lens element being designated 1, and the minor lens element 2. The major lens element 1 has formed therein adjacent one edge a concave depression or seat 3. This seat 3 is ordinarily ground to an exact curvature which may vary according to the correction required. The minor lens element 2 is circular in shape and is provided with a convex surface 4 which is preferably ground so that its curvature is slightly more than that of the concave surface 3. If, as in the embodiment shown, the major lens element 1 is designed to be ground into a toric lens, its upper and lower surfaces are also curved as shown.

The major lens element 1 is mounted upon a supporting base or block 5 which is of refractory clay or other suitable material which will not be injured by the heat of fusing. This block has its upper face 5' curved to coincide with the curvature of the bottom face of the major lens element 1. As will be clear from Fig. 1, the surface 5' slants or inclines so that the thickness of the block is greater along one edge than it is at the other, the major lens element 1 being preferably positioned upon this block so that its seat or depression 3 is adjacent the thinner end of the block. The minor lens element is positioned as shown in Fig. 1, that is, tilted so that it is in contact with the concave seat or depression 3 only at one point adjacent the peripheral edges of both lens elements. When the minor lens element 2 is in this position, the lens element 2 is free to swing upon this point of contact as a pivot, and it has been found that this frequently occurs while the blocks with the lens elements mounted thereupon are being placed within the fusing chamber or oven. To hold the lens element in tilted position and also to prevent any lateral swing thereof, a fuse clip, which forms the basis of this invention, can be utilized. This clip comprises a base 10 which, if desired, may fit into a depression 11 formed in the bottom of the supporting block 5, which base carries two uprights 12 and 13, the base and uprights being preferably integral and formed or stamped from a piece of sheet metal. Slidably mounted upon the two uprights 12 and 13, is a clamping member 14 which also consists of a piece of sheet metal having its ends bent over as at 15 and 15' to loosely engage around the uprights 12 and 13. These bent-over portions are preferably slotted as at 16 to provide resilient fingers 17, which fingers may be bent slightly inwardly to closely engage the uprights 12 and 13 to prevent the free movement of the clamping member upon the uprights. Lugs or ears 18 are formed adjacent the bottom of each of the bent-over portions 15 and 15', which lugs or ears are adapted to engage the top surface of the minor lens element 2 to force it into the tilted position shown in Fig. 1 and to hold it there prior to the fusing operation.

The uprights 12 and 13 should be spaced apart a distance which is determined by the diameter of the circular minor lens element 2, that is, should be spaced apart a distance which will permit the circular lens element to contact with the inner corner edges of the uprights as at points 19 and 20, and bring the minor lens element directly over the curved seat 3 in the major lens element 1 when the edge 21 of the major lens element also rests against the uprights 12 and 13.

In assembling the lens elements prior to fusing, the base 10 of the fuse clip is first placed underneath the block 5 preferably in the depression 11, so that the uprights 12 and 13 rest against the thin edge of the block 5, as shown in Fig. 1. The major lens element 1 is then placed upon the block so that its edge 21 will engage with the uprights 12 and 13 and the transverse axis of the lens, which coincides with the line 1—1 shown in Fig. 2, will be medially disposed between the edges 19 and 20 of the uprights. With the lens blank 1 in this position, the minor lens element 2 is placed in the concave seat of the major lens element 1 with its convex surface 4 resting upon the concave surface of the major lens element. Due to the inclination of the major lens element 1 toward the uprights 12 and 13, the minor lens element 2 will slide downwardly toward the uprights 12 and 13 and will come to rest with its peripheral edge in engagement with the edges 19 and 20 of these uprights which serve to support it in correct position in the seat, and also to prevent its lateral movement. The clamping member 14 is then slid down over the upper ends of the uprights 12 and 13 until the lugs 18 engage with and tilt the minor lens element 2 to the position shown in Fig. 1, the friction between the spring fingers 17 and the uprights 12 and 13 being sufficient to hold the clamping member 14 in place. The lens elements are then ready to place into the oven or furnace for fusing and since the circular lens element 2 is in engagement with the uprights 12 and 13 at points 19 and 20, and since the lugs 18 also engage the circular lens element, any inadvertent movement of this element is prevented.

As soon as the fusing operation begins the lens element 2 will first fuse to the major element 1 adjacent their points of contact which will draw it away from the lugs 18, the fused portions then holding the minor lens element in position, while it gradually breaks down, as described. The minor lens element will draw away from the lugs 16 before it is soft enough to have these lugs mark or mar the upper surface of the minor lens element, which, before fusing, exerts a slight upward pressure against the lugs. After the fusing operation is finished, the minor lens element 2 will, therefore, be free from all marks upon its upper surface, and, furthermore, since the clamping member 14 is not urged downwardly by any spring action or its equivalent, any deformation of the concave surface 3 is prevented.

I claim:

1. A fuse clip of the class described, comprising a plurality of spaced uprights against which the major and minor lens elements are adapted to abut, and clamping means associated with said uprights engaging the upper face of the minor lens element and holding it in a tilted position with respect to the major lens element.

2. A fuse clip of the class described, comprising a plurality of spaced uprights against which the major and minor lens elements are adapted to abut, and a clamping device slidably mounted on said uprights engaging the upper face of the minor lens element and holding it in a tilted position with respect to the major lens element.

3. A fuse clip of the class described, comprising a plurality of spaced uprights against which the major and minor lens elements are adapted to abut, a clamping device slidably mounted on said uprights engaging the upper face of the minor lens elements, and means for retarding the sliding movement of said device upon said uprights, whereby said clamping device holds the minor lens element in a tilted position with respect to the major lens element.

4. A fuse clip of the class described, comprising a plurality of spaced uprights against which the major and minor lens elements are adapted to abut, a clamping device slidably mounted on said uprights engaging the upper face of the minor lens element, and resilient means for retarding the free sliding movement of said clamping device whereby said clamping device holds the minor lens element in a tilted position with respect to the major lens element.

5. A fuse clip of the class described, comprising a plurality of spaced uprights against which the major and minor lens elements are adapted to abut, and a clamping device slidably mounted upon said upright having projections adapted to engage the upper face of the minor lens element and hold it in tilted position with respect to the major lens element.

6. A fuse clip of the class described, comprising a plurality of spaced uprights against which the major and minor lens elements are adapted to abut, a part slidably mounted upon said uprights, said part having resilient fingers adapted to engage said uprights, and means carried by said part adapted to engage the upper face of the minor lens elements and hold it in tilted position with respect to the major lens element.

In witness whereof, I subscribe my signature, in the presence of two witnesses.

GEORGE ALBERT CLEMENT.

Witnesses:
F. L. HIGGINS,
AMELIA C. MOESCHEN.